(12) United States Patent
Walter et al.

(10) Patent No.: US 7,809,036 B2
(45) Date of Patent: Oct. 5, 2010

(54) PUMP LIGHT CONTROL OF A LAMP-PUMPED LASER

(75) Inventors: Martin Walter, Epfendorf (DE); Rainer Achim Flaig, Eschbronn (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 130 days.

(21) Appl. No.: 11/936,605

(22) Filed: Nov. 7, 2007

(65) Prior Publication Data

US 2008/0107143 A1    May 8, 2008

(30) Foreign Application Priority Data

Nov. 8, 2006  (DE)  .................. 10 2006 052 582

(51) Int. Cl.
*H01S 3/00*    (2006.01)
(52) U.S. Cl. .............. 372/38.02; 372/38.01; 372/38.06; 372/38.07
(58) Field of Classification Search .............. 372/38.02, 372/38.1
See application file for complete search history.

(56) References Cited

U.S. PATENT DOCUMENTS

| | | | | |
|---|---|---|---|---|
| 4,856,012 | A * | 8/1989 | Takenaka | 372/29.014 |
| 5,202,892 | A | 4/1993 | Harwick | |
| 5,455,837 | A * | 10/1995 | Negus et al. | 372/69 |
| 6,462,862 | B2 * | 10/2002 | Kinoshita | 359/334 |
| 6,980,571 | B1 | 12/2005 | Press et al. | |
| 6,996,144 | B2 * | 2/2006 | Tayebati | 372/38.06 |
| 7,366,214 | B2 * | 4/2008 | Liu et al. | 372/38.1 |
| 2004/0151217 | A1 * | 8/2004 | Yeik | 372/25 |

FOREIGN PATENT DOCUMENTS

| | | |
|---|---|---|
| CN | 1260614 | 7/2000 |
| EP | 0707362 | 4/1996 |
| EP | 1020968 | 7/2000 |
| GB | 2023330 | 12/1979 |
| JP | 6-13685 | 1/1994 |

OTHER PUBLICATIONS

English translation of Office Action from corresponding German Patent Application No. 10 2006 052 582.5-54, mailed Feb. 21, 2007, 2 pages.
Search Report from European Patent Office for corresponding European Application No. 07 02 1166, mailed Feb. 18, 2008, 8 pages.
Japanese Office Action from corresponding Japanese Application No. 200710169816.7 with English translation, mailed Jun. 22, 2009, 8 pages.
Office Action from corresponding German Patent Application No. 10 2006 052 582.5-54, mailed Feb. 21, 2007, 4 pages.
Chinese Office Action from corresponding Chinese Application No. 200710169816.7 with English translation, mailed Jun. 22, 2009, 8 pages.

* cited by examiner

*Primary Examiner*—Minsun Harvey
*Assistant Examiner*—Phillip Nguyen
(74) *Attorney, Agent, or Firm*—Fish & Richardson P.C.

(57) ABSTRACT

A lamp-pumped laser includes a pump light source for optically pumping a laser medium, such as a laser rod, a pump light sensor that detects the optical pumping power of the pump light source, and a control unit connected to receive an output signal from the pump light sensor and to increase the electric power of the pump light source on the basis of the detected optical pumping power and in correspondence with a predetermined rise characteristic of the optical pumping power.

23 Claims, 3 Drawing Sheets

PUMP LIGHT CONTROL OF A LAMP-PUMPED LASER

CROSS REFERENCE TO RELATED APPLICATION

This application claims priority under 35 U.S.C. §119(a) to German Application No. DE 10 2006 052 582.5, filed on Nov. 8, 2006, the entire contents of which are hereby incorporated by reference.

TECHNICAL FIELD

The description relates to a method of electrically driving a pump light source, and also to a lamp-pumped laser.

BACKGROUND

Flash lamps, which are discharge lamps used for laser pumping, can exhibit instable behavior in the short-pulse range (for example, for pulses less than about 0.5 ms). Thus, a correlation between pump light emitted from the flash lamp and the flash lamp current, voltage, or electric pumping power is possible only to a limited degree. The differentiation between stable and instable flash lamp behavior is thereby primarily based on the specific transient oscillation behavior. FIGS. 3a and 3b illustrate this on the basis of two oscilloscope recordings of a conventional prepulse control using the current of the flash lamp, which has previously been used to bring the laser to the laser threshold. FIGS. 3a and 3b show the laser light power $P_{laser}$, the pump light power $P_{pump}$, and the flash lamp current $I_B$, or the current default $I_{SET}$ (FIG. 4) for the current-controlled lamp current source relative to time. The flash lamp current $I_B$ is current-controlled using a ramped current default at the flash lamp current source. When the pulse duration and the pulse power parameters are identical, FIG. 3a shows a relatively faster pump light power increase to the trigger level of the laser (laser threshold power) and FIG. 3b shows a relatively slower increase. In contrast to FIG. 3b, FIG. 3a shows the non-transient first pulse of a pulse sequence, whereas the transient state has been reached in FIG. 3b.

As is shown in FIG. 4 for a plurality of oscilloscope recordings that are shown on top of each other (where the horizontal scale is time), the differing increase in pump light power produces a trigger jitter $\Delta$ of approximately 250 μs, where all oscilloscope recordings are shown being shifted (triggered) to a common laser pulse start. A jitter $\Delta$ defines temporal fluctuations/inaccuracies in a clocked process, i.e., the laser pulses are not triggered at identical intervals in the short pulse range, but are delayed or prematurely triggered. An instable transient behavior of the flash lamp causes pulse trigger jitter, since the time intervals vary in which the optical pumping power reaches the laser threshold.

SUMMARY

A lamp-pumped laser includes a resonator formed from a laser medium placed between two mirrors, where the laser medium is pumped by a pump light source. The optical pumping power of the pump light source is detected and transferred to a control unit, which drives the pump light source. The control unit increases the electric power of the pump light source based on the detected optical pumping power and based on a predetermined rise characteristic of the optical pumping power. The control unit can use this feedback information prior to the pump light source reaching the laser threshold power and/or after the laser threshold power is reached.

In one general aspect, the invention features a lamp-pumped laser that includes a pump light source for optically pumping a laser rod, a pump light sensor that detects the optical pumping power of the pump light source, and a control unit connected to receive an output signal from the pump light sensor and to increase the electric power of the pump light source on the basis of the detected optical pumping power and in correspondence with a predetermined rise characteristic of the optical pumping power.

Implementations can include one or more of the following features. For example, the pump light sensor can be designed for optical detection of the pumping power. The laser can include a highly reflective mirror and an output mirror, where the highly reflective mirror, the output mirror, and the laser rod define a resonator. The pump light sensor can be provided outside of the resonator. The pump light sensor can be provided behind the highly reflective mirror. The pump light sensor can be provided on the pump light source. The pump light sensor can be provided within or outside of the resonator. The pump light source can be or include a flash lamp.

The laser can include a spectral filter provided upstream of the pump light sensor, and that is configured to only permit passage of the pump light. The laser can include a laser power sensor connected to the control unit and configured to detect the power of the laser beam and convey the detected power to the control unit. The laser can include an evaluation unit that evaluates the signals of the pump light sensor and of the laser power sensor.

In another general aspect, the invention features methods for electrically driving a pump light source of a lamp-pumped laser that include increasing an electrical power of the pump light source to at least a laser threshold power to trigger a laser pulse within a laser resonator, and detecting the optical pumping power of the pump light source. The electric power of the pump light source is increased in a controlled fashion based on the detected optical pumping power and based on a predetermined rise characteristic of the optical pumping power.

Implementations can include one or more of the following features. For example, the pumping power of the pump light source can be optically detected. The pumping power of the pump light source can be detected outside of the laser resonator.

The predetermined rise characteristic of the optical pumping power can be a ramp that rises up to the laser threshold power. The electric power of the pump light source can be controlled on the basis of the power of a laser beam produced within the laser resonator after the laser threshold power is reached.

In some embodiments, the power of decoupled radiation from the laser resonator can be detected. Moreover, the electric power of the pump light source can be increased by determining whether the decoupled radiation is laser radiation, and by controlling the power of the pump light source based on the power of the decoupled radiation if the decoupled radiation is laser radiation.

In certain embodiments, the electric power of the pump light source can be increased by comparing the detecting pumping power with a predetermined value that is governed by the predetermined rise characteristic, and if the detected pumping power does not match the predetermined value, by adjusting the electric power of the pump light source to cause the pumping power to more closely match the predetermined value.

In any of these embodiments, the pump light source can be a flash lamp, and the electrical power of the pump light source can be increased by increasing an electrical current to the pump light source. Alternatively, the electric power of the pump light source can be increased by adjusting the pumping power of the pump light source so that the detected pumping power matches a predetermined value within the predetermined rise characteristic.

The pumping power of the pump light source after can be detected after the laser threshold power is reached.

In another general aspect, the invention features control systems and methods used for triggering laser pulses, for example, in the short pulse range, for reducing jitter, for example, when flash lamps with instable behavior are used, and to provide a corresponding lamp-pumped laser.

The pump light power (that is, the optical pumping power of the pump light source) is detected with a pump light sensor, and the electric power of the pump light source is increased in a controlled fashion based on the detected pumping power and based on a predetermined rise characteristic of the optical pumping power. For example, the pumping power of the pump light source can be optically detected.

The pump light power is brought to the laser threshold power in a controlled fashion, and, if necessary, taking into consideration further comparative quantities (e.g., actual/nominal value adjustment). In particular, the pump light power is adjusted by a feedback loop that includes the detected pump light power, which is fed into a control unit that controls the current of the pump light source. In the non-transient state, the pump light power may stray from the predetermined rise characteristic, for example, according to the pump current. Therefore, the feedback loop is used to adjust the pump light power by adjusting the pump current so that the pump light power follows the predetermined rise characteristic based on the detected pump light power.

The optical prepulse pump light control considerably reduces the trigger jitter and consequently also the prepulse duration compared to conventional current-controlled prepulse control. In other words, the transient oscillation behavior of flash lamps is adjusted, thereby enabling jitter-reduced and accelerated triggering of laser pulses. Due to the optical pump light control, the transient oscillation behavior plays a minor role, such that flash lamps having a longer service life can be used.

The optical pump light control method provides one or more of the following advantages, for example, when flash lamps are used. Trigger jitter can be reduced to a minimum (for example, less than or equal to 50 µs). Prepulse duration can be reduced by at least 30%, i.e., the corresponding laser devices can be operated at a higher maximum frequency. Transient oscillation behavior plays a minor role in the selection of lamps, i.e., the lamps can be optimized in view of service life. Control of short pulses is improved due to defined pumping power during laser use.

The optical pumping power of the pump light source can be detected outside of the laser resonator. The predetermined rise characteristic of the optical pumping power can have any curve shape, e.g., it can be a ramp that rises up to the laser threshold power, it can have a parabolic shape, it can have a step (or rectangular) shape, or a ramp of a different slope.

Additionally, the electric power of the pump light source can be controlled on the basis of the laser power after the laser threshold has been reached. In particular, the electric power of the pump light source can be adjusted by comparing a measured laser power with a predetermined value and adjusting the pump current to adjust the laser power so that the measured laser power matches (that is, is closer to or equal to) the predetermined value. Thus, an optical prepulse control method is implemented before the laser threshold is reached and an optical laser power control method is implemented after the laser threshold is reached. Detection of the pumping power of the pump light source can be continued after the laser threshold is reached, such that at the start of optical laser power control, the pump light signal can be used for diagnosis.

The measured "pump light energy" can be related to the measured laser energy, e.g., through integral detection of the pump light power (using the photo diode) during the laser pulse in order to determine the efficiency of the laser configuration and possible aging effects, maladjustment, etc. The pump light power and the laser power are measured, then compared, as discussed above, using an integral measuring technique. The measured laser power may be off from its predetermined value, and this may indicate an aging effect. For example, a laser crystal that is aging may display a decreased laser power for the same pump power. The photo diode for pump light detection could thereby have a spectral filter, such that only pump light and no laser light is measured at the photo diode (because the HR mirror has a limited reflectivity in practice).

In another general aspect, a lamp-pumped laser includes a pump light source, for example, a flash lamp, for optically pumping a laser medium. The laser includes a resonator that is defined by the HR mirror and an output mirror. The laser also includes a pump light sensor (e.g., a photo diode) that detects the optical pumping power of the pump light source and a control unit that receives an output signal from the photo diode that indicates the detected pumping power and increases the electric power of the pump light source based on the detected pumping power in accordance with a predetermined rise characteristic of the optical pumping power. Detection during prepulse control need not be highly precise since the pump light sensor does not control the laser power. For adjusting the laser power by using the detected pumping power, the measurement can be made more precise, e.g., by using a spectral filter placed in front of the photo diode.

The pump light sensor (that is, the photo diode that detects the pump light power) can be provided outside of the resonator, i.e., behind the HR mirror, since such a configurations can offer the following advantages. For example, the pump light sensor (the photo diode) can provide for simple and good detection of the pump light power at the HR mirror. The pump light sensor can detect the pump light scattered in the laser medium (for example, the laser rod), such that by observing the overall scattered light, local effects can be neglected. Because the HR mirror is largely transparent for the pump light, beam splitters or the like are not required.

The pump light sensor can, in principle, also be disposed directly on the flash lamp or in the resonator.

The lamp-pumped laser can include a laser power sensor that detects the power of the laser beam, to detect when the laser threshold has been reached and subsequently control the laser using this laser power sensor. The laser power sensor can either be disposed outside of the laser resonator for detecting the power of the decoupled beam or within the laser resonator. The pump light sensor (that is, the photo diode that detects the pump light power) and the laser power sensor can also be positioned at different measuring points or at the same measuring point.

Additionally, an evaluation unit can be provided. The evaluation unit evaluates the signals of the pump light sensor (that is, the photo diode that detects the pump light power) and of the laser power sensor. The efficiency of the laser configuration and possible aging effects, misalignment etc. can e.g. be detected based on these parallel laser and pump light measurements.

Further advantages and advantageous embodiments of the subject matter of the invention can be extracted from the description, the drawing and the claims. The features mentioned above and below may be used individually or collectively in arbitrary combination. The embodiment shown and described is not to be understood as exhaustive enumeration but has exemplary character for describing the invention.

DETAILED DESCRIPTION

Figure 1:
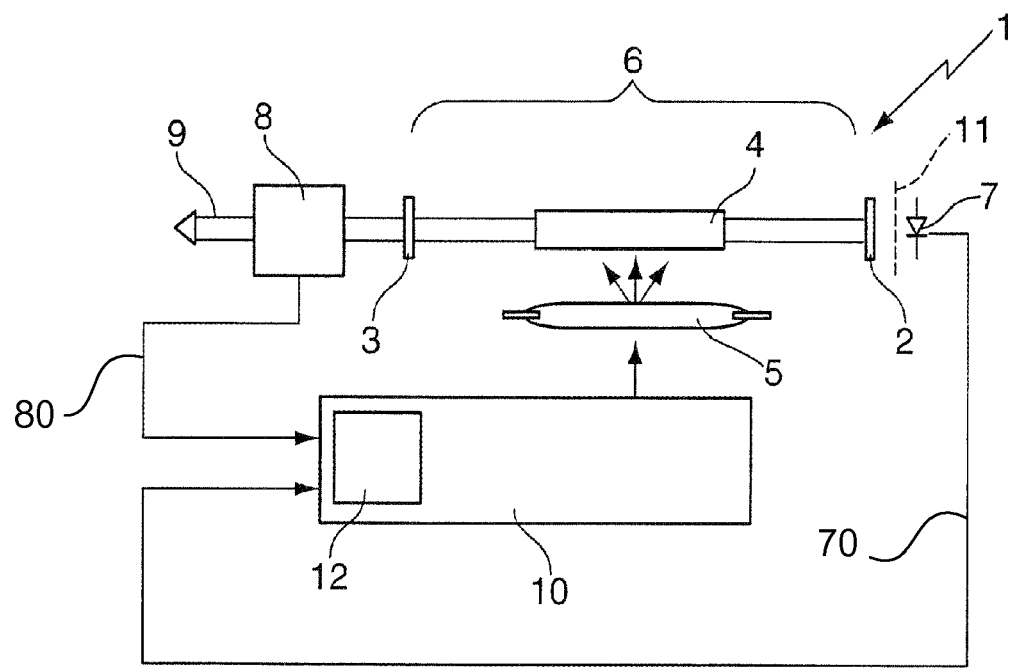
FIG. 1 is a block diagram of a lamp-pumped laser with an optical prepulse pump light control.

Referring to FIG. 1, a lamp-pumped laser 1 includes a laser resonator 6 formed from a laser medium 4 (e.g., of Nd:YAG, Nd:YVO$_4$, etc.) placed between a highly reflective rear mirror (HR mirror) 2 and a partially reflecting output mirror 3. In this implementation, the laser medium 4 is designed as a laser rod and is optically pumped from the jacket side using a pump light source 5 such as a flash lamp, and a laser beam 9 is decoupled from the laser resonator 6 through the output mirror 3. The flash lamp 5 can be, for example, a krypton or a xenon flash lamp, depending on power densities.

A pump light sensor 7 is disposed outside of the laser resonator 6, and, in some implementations, behind the HR mirror 2, for detecting the optical pumping power of the flash lamp 5. That is, the pump light sensor 7 is outside the laser resonator 6 or on the side of the HR mirror 2 that is external to the laser resonator 6. The pump light sensor 7 is behind the HR mirror 2, which means that it is in the optical path of the laser resonator 6. In this way, the pump light sensor 7 can provide a simple and accurate detection of pump light power on the HR mirror 2. Moreover, the pump light sensor 7 provides integral detection of the pump light scattered in the laser medium 4, such that by observing the overall scattered light, local effects are neglected. Because the HR mirror 2 is largely transparent for the pump light, beam splitters or the like are not required. The pump light sensor 7 can be, for example, a photo diode or a photo transistor.

A laser power sensor 8 is provided outside of the laser resonator 6 for measuring the power of the laser beam 9 decoupled from the laser resonator 6. The output signals 70, 80 of, respectively, the photo diode 7 and the laser power sensor 8 are supplied to a control unit 10, which drives the flash lamp 5 on the basis of these output signals, as described below. The laser power sensor 8 can be, for example, a photo diode or a photo transistor. The control unit 10 can include a central processor unit (CPU), an I/O unit, and memory that stores data and various programs such as an operating system, and one or more application programs.

The optical pumping power of the flash lamp 5 is detected with the pump light sensor 7 and is transferred as an output signal 70 to the control unit 10, which drives the flash lamp 5. The control unit 10 can take into consideration further comparative quantities (e.g., actual/nominal value adjustment of the pumping power). The control unit 10 increases the electric power of the flash lamp 5 in a controlled fashion to the laser threshold power based on the detected optical pumping power from the pump light sensor 7 and in correspondence with a predetermined rise characteristic of the optical pumping power. The laser threshold power is the optical pumping power at which the gain of the resonator 6 exceeds the losses of the resonator 6 (the gain is just sufficient to start lasing). The shape of the predetermined rise characteristic is, for example, determined by experiments and the values of the rise characteristic can be archived in a database.

The laser power sensor 8 detects when the laser threshold power has been reached by detecting the power of the laser beam 9 decoupled from the resonator 6. The laser 1 is subsequently controlled by the control unit 10 based on the output 80 of the laser power sensor 8, i.e., optical prepulse control changes to laser power control after reaching the laser threshold, as further discussed below. The laser power sensor 8 detects the power of the laser beam 9 and the output 80 of the laser power sensor 8 is fed into the control unit 10, which uses this information to detect when the laser threshold has been reached and subsequently to control the flash lamp 5.

As indicated by dashed lines, the pump light sensor 7 can have an upstream spectral filter 11 that transmits light at the wavelength of the pump source 5, such that only pump light from the flash lamp 5 (and no laser light) is measured. The filter 11 provides more precise control of the pumping power to control the laser power. In some implementations, the filter 11 can simply block the wavelength at which the laser propagates.

An evaluation unit 12 can also be provided. The evaluation unit 12 evaluates the signals 70, 80 of, respectively, the pump light sensor 7 and the laser power sensor 8. The evaluation unit 12 can be provided within the control unit 10 or can be outside of and connected to the control unit 10. The evaluation unit 12 compares a detected signal (from signals 70, 80) with a target or predetermined value. The evaluation unit 12 can be a microprocessor, a Field Programmable Gate Array (FPGA), or any other evaluation electronics. The signal processing performed by the evaluation unit 12 can be analog or digital.

The efficiency of the configuration of the laser 1 and possible aging effects, misalignment, etc. can be detected by means of this parallel laser and pump light measurement (provided by both the pump light sensor 7 and the laser power sensor 8).

Figure 5:
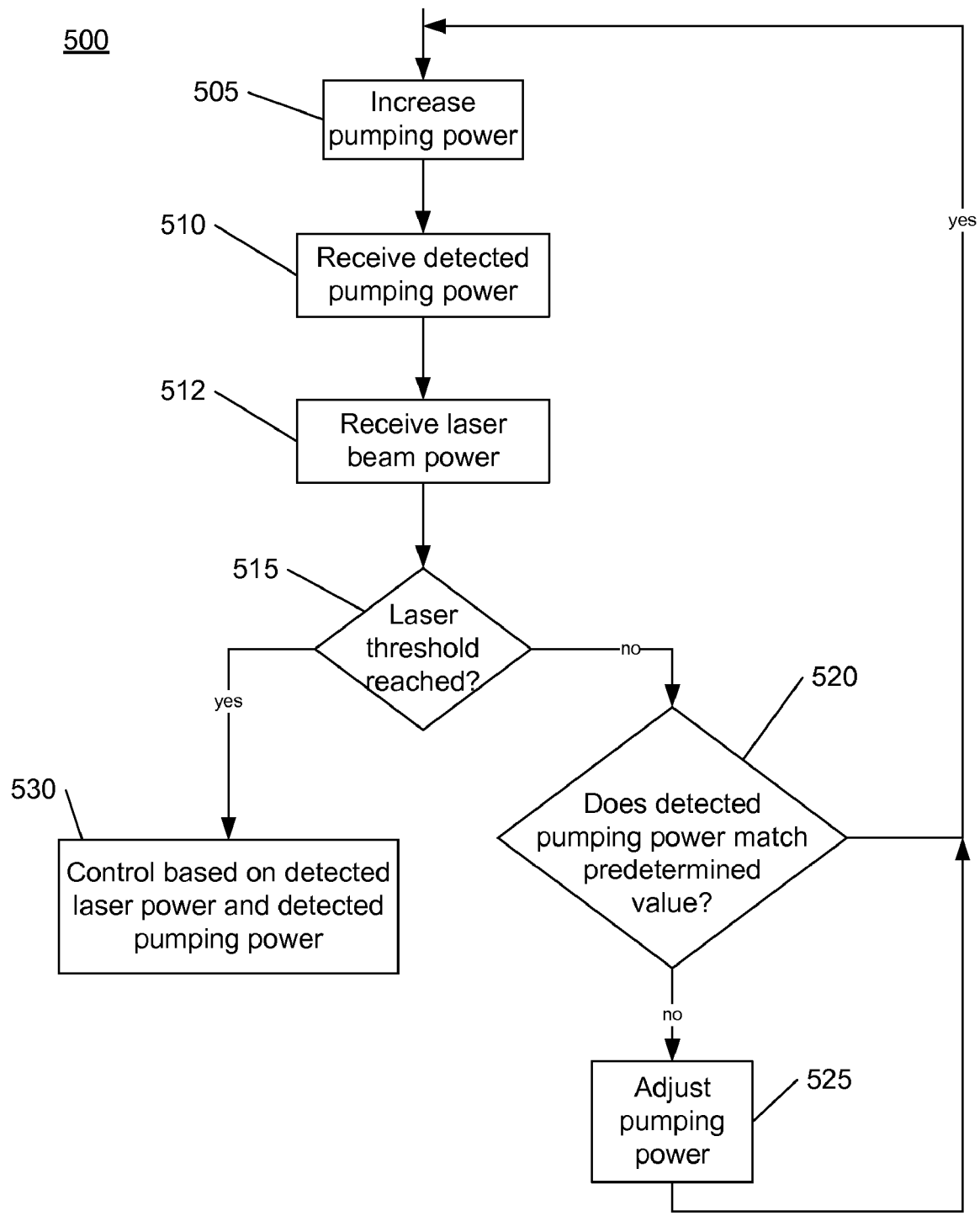
FIG. 5 is a flow chart of a procedure for electrically driving a pump light source such as that shown in FIG. 1

Referring to FIG. 5, a procedure 500 can be performed for driving the pump light source 5. Initially, the control unit 10 increases the electrical power of the pump light source 5 (step 505). Ultimately, the control unit 10 increases the electrical power of the pump light source 5 to at least the laser threshold power of the optical pumping power to trigger a laser pulse within a laser resonator and then continues to increase or adjust the electrical power of the pump light source 5 to control the laser pulse. During the increase in electrical power (either before the laser threshold power is reached or after the laser threshold power is reached), the control unit 10 performs additional diagnostic steps, as discussed below.

The pumping power of the pump light source 5 is detected by the pump light sensor 7 and the detected pumping power is received by the control unit 10 (step 510). Additionally, the control unit receives the output 80 of the laser power sensor 8, which provides the laser beam power (step 512).

The control unit 10 determines whether the laser threshold power is reached (step 515). If the laser threshold power has not been reached (step 515), then the control unit 10 operates in an optical prepulse control mode and determines whether the detected pumping power matches a predetermined value (based on the predetermined rise characteristic) (step 520). If the detected pumping power does not match the predetermined value (step 520), the control unit 10 adjusts the electrical power of the pump light source 5 in a manner that causes the pumping power to be adjusted (step 525) to more closely match the predetermined value. After adjustment (step 525) or if the control unit 10 determines that the pump power matches the predetermined value (step 520), the control unit 10 continues to increase the electrical power of the pump light source 5 (step 505). The pump power more closely matches the predetermined value if the absolute difference between the predetermined value and the pump power after adjustment is less than the absolute difference between the predetermined value and the pump power prior to adjustment. Moreover, the pump power can match the predetermined value if it is close enough to the predetermined value to enable a controlled increase in optical pump power. In this way, the control unit 10 increases the electric power of the pump light source 5 (steps 505-525) in a controlled fashion based on the detected pumping power and based on a predetermined rise characteristic of the optical pumping power.

If the control unit 10 determines that the laser threshold power is reached (step 515), then the control unit 10 controls the electric power of the pump light source 5 on the basis of the laser power (step 530), that is, the control unit 10 switches from optical prepulse control mode to an optical laser power control mode once it determines that (using the output of the laser power sensor 8) the laser threshold power has been reached at step 515. The pump light sensor 7 continues to detect the pumping power of the pump light source (the flash lamp 5) after the control unit 10 determines that laser threshold power has been reached (step 515), such that at the start of laser power control, the pump light signal detected by the pump light sensor 7 can be used by the control unit 10 for diagnosis. The measured "pump light energy" can be related to the measured laser energy, e.g., through integral detection of the pump light signal (using the pump light sensor 7) during the laser pulse to determine the efficiency of the laser configuration and possible aging effects, misalignment, etc. The pump light signal and the laser power are related by the conversion rate (that is, how much of the pump light signal is converted into the laser power). If an aging effect or a misalignment results in a lower conversion, this can be detected by comparing the pump light energy or power with the laser energy or power.

The pump light sensor 7 for pump light detection can include a spectral filter 11, such that only pump light (from the flash lamp 5) and no laser light is measured at the pump light sensor 7 (since the HR mirror 2 may have a limited reflectivity in practice).

Figure 2:
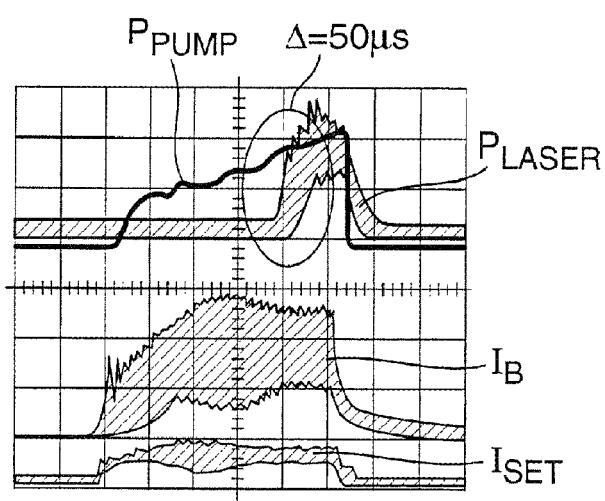
FIG. 2 is a graph of a plurality of oscilloscope recordings, disposed on top of each other, of the prepulse pump light control of FIG. 1, triggered to the trigger time in each case.
Figure 3A:
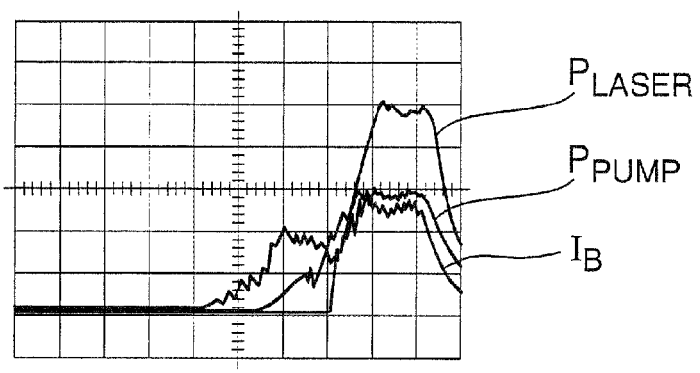
FIGS. 3a and 3b are graphs of oscilloscope recordings of a conventional current-controlled prepulse control of the lamp current in the non-transient state and in the transient state, respectively.
Figure 3B:
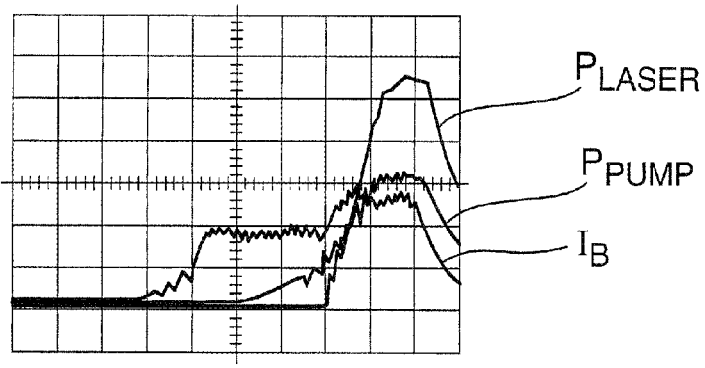
Figure 4:
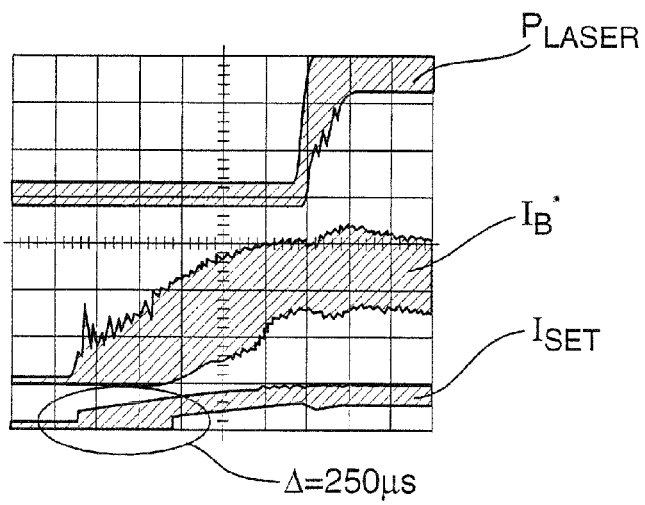
FIG. 4 is a graph of the oscilloscope recordings shown in FIG. 3, disposed on top of each other and triggered to the trigger point in each case.

FIG. 2 shows a plurality of oscilloscope recordings, shown on top of each other, of the prepulse pump light control, which are all shown being shifted (triggered) to a common laser pulse start. FIG. 2 shows the laser light power $P_{laser}$, the ramp-shaped pump light power default $P_{pump}$, the flash lamp current $I_B$, and the associated current default $I_{SET}$ for the current-controlled lamp current source. The optical prepulse pump light control reduces the trigger jitter $\Delta$ to approximately 50 μs, such that the transient oscillation behavior plays a minor role and flash lamps having a longer service life can be used.

The pump light sensor 7 can, in other implementations, be disposed directly on the flash lamp 5 or within the resonator 6. In other implementations, the laser power sensor 8 can be disposed within the laser resonator for detecting the power of the laser beam prior to being decoupled by the output mirror 3. The pump light sensor 7 and the laser power sensor 8 can be positioned at different measuring points (as shown in FIG. 1) or at the same measuring point (for example, within the resonator 6 and between the laser medium 4 and the output mirror 3).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for electrically driving a pump light source of a lamp-pumped laser, the method comprising:
    increasing an electrical power of the pump light source to at least a laser threshold power to trigger a laser pulse within a laser resonator, and
    detecting optical pumping power of the pump light source prior to reaching the threshold power,
    wherein the electrical power of the pump light source is increased in a controlled fashion based on the detected optical pumping power and based on a predetermined rise characteristic of the optical pumping power prior to reaching the threshold power, and
    subsequent to reaching the threshold power, the electrical power of the pump light source is controlled based on a power of a laser beam from the lamp-pumped laser.

2. The method of claim 1, wherein the pumping power of the pump light source is optically detected.

3. The method of claim 1, wherein the pumping power of the pump light source is detected outside of the laser resonator.

4. The method according of claim 1, wherein the predetermined rise characteristic of the optical pumping power is a ramp that rises up to the laser threshold power.

5. The method of claim 1, wherein the electric power of the pump light source is controlled based on the power of the laser beam within the laser resonator after the laser threshold power is reached.

6. The method of claim 1, further comprising detecting power of decoupled radiation from the laser resonator, wherein increasing the electric power of the pump light source includes:
    determining whether the decoupled radiation is laser radiation, and
    controlling the power of the pump light source based on the power of the decoupled radiation if the decoupled radiation is laser radiation.

7. The method of claim 1, wherein increasing the electric power of the pump light source in a controlled fashion based on the detected pumping power and based on the predetermined rise characteristic of the optical pumping power includes:
    comparing the detecting pumping power with a predetermined value that is governed by the predetermined rise characteristic, and if the detected pumping power does not match the predetermined value, adjusting the electric power of the pump light source to cause the pumping power to more closely match the predetermined value.

8. The method of claim 1, wherein the pump light source is a flash lamp.

9. The method of claim 1, wherein increasing the electrical power of the pump light source includes increasing an electrical current to the pump light source.

10. The method of claim 1, wherein the electric power of the pump light source is increased by adjusting the pumping power of the pump light source so that the detected pumping power matches a predetermined value within the predetermined rise characteristic.

11. The method of claim 1, further comprising detecting the pumping power of the pump light source after the laser threshold power is reached.

12. A lamp-pumped laser comprising:
a pump light source for optically pumping a laser medium,
a pump light sensor that detects the optical pumping power of the pump light source,
a control unit connected to receive an output signal from the pump light sensor and to increase an electrical power of the pump light source on the basis of the detected optical pumping power and in correspondence with a predetermined rise characteristic of the optical pumping power, and
a laser power sensor, separate from the pump light sensor, connected to the control unit and configured to detect a laser beam power of a laser beam emitted from the laser medium and convey the detected laser beam power to the control unit.

13. The laser of claim 12, wherein the pump light sensor is designed for optical detection of the pumping power.

14. The laser of claim 12, further comprising a highly reflective mirror and an output mirror, wherein the highly reflective mirror, the output mirror, and the laser medium define a resonator.

15. The laser of claim 14, wherein the pump light sensor is provided outside of the resonator.

16. The laser of claim 14, wherein the pump light sensor is provided behind the highly reflective mirror.

17. The laser of claim 14, wherein the pump light sensor is provided on the pump light source.

18. The laser of claim 14, wherein the pump light sensor is provided within the resonator.

19. The laser of claim 12, wherein the pump light source includes a flash lamp.

20. The laser of claim 12, further comprising a spectral filter provided upstream of the pump light sensor, and that is configured to only permit passage of the pump light.

21. The laser of claim 12, further comprising an evaluation unit that evaluates the signals of the pump light sensor and of the laser power sensor.

22. The method of claim 1, wherein detecting optical pumping power of the pump light source comprises detecting light emitted from the pump light source.

23. The laser of claim 12, wherein the pump light sensor is arranged to detect light emitted by the pump light source.

* * * * *

UNITED STATES PATENT AND TRADEMARK OFFICE
CERTIFICATE OF CORRECTION

| | | |
|---|---|---|
| PATENT NO. | : 7,809,036 B2 | Page 1 of 1 |
| APPLICATION NO. | : 11/936605 | |
| DATED | : October 5, 2010 | |
| INVENTOR(S) | : Martin Walter and Rainer Flaig | |

It is certified that error appears in the above-identified patent and that said Letters Patent is hereby corrected as shown below:

Column 8, line 44 (Claim 4, line 1) after "method" delete "according".

Signed and Sealed this
Second Day of October, 2012

David J. Kappos
*Director of the United States Patent and Trademark Office*